Feb. 27, 1934.                S. S. GRADY                1,948,519
                          CIRCUIT INTERRUPTER
             Original Filed Aug. 17, 1929        3 Sheets-Sheet 1
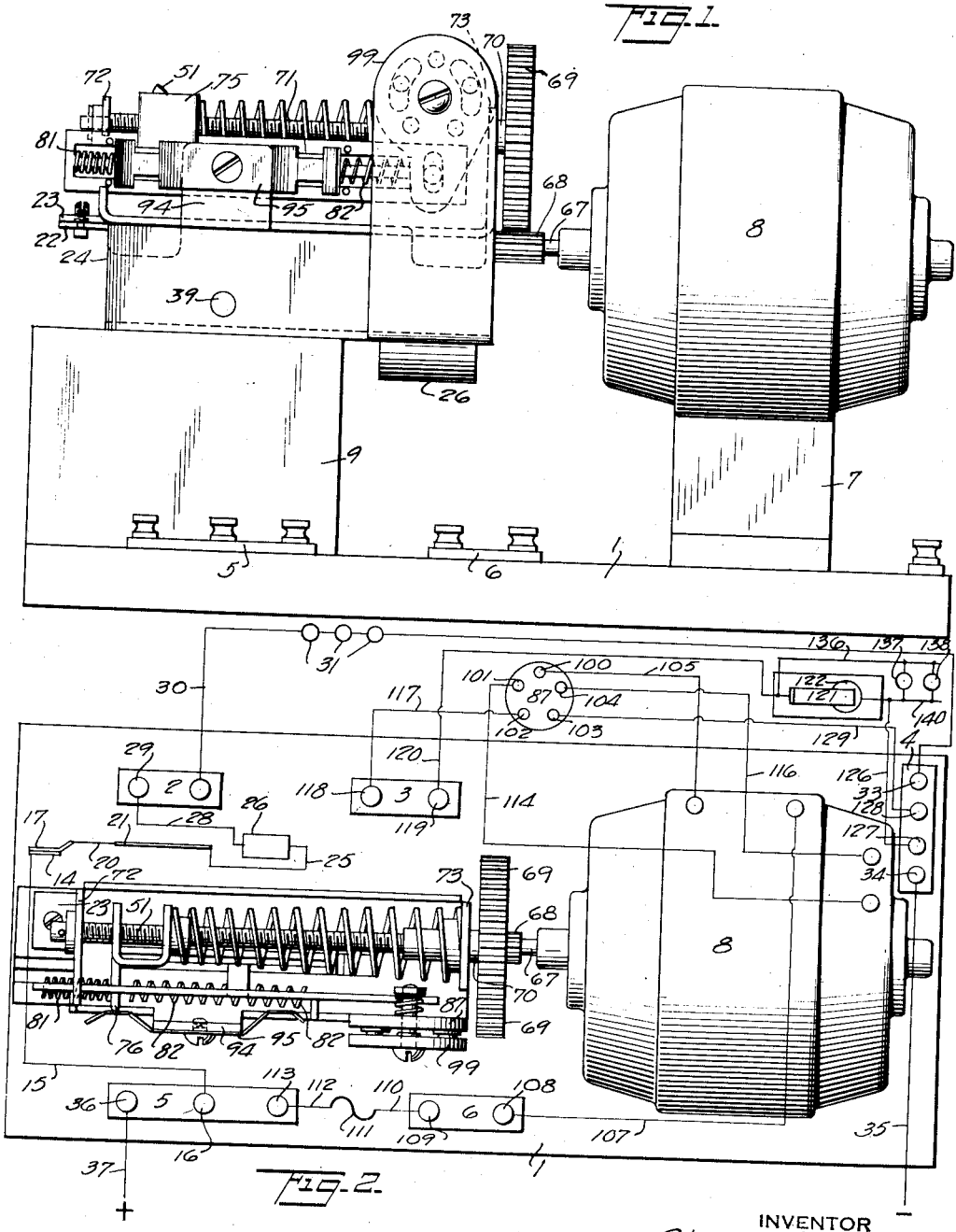

Feb. 27, 1934.   S. S. GRADY   1,948,519
CIRCUIT INTERRUPTER
Original Filed Aug. 17, 1929   3 Sheets-Sheet 2
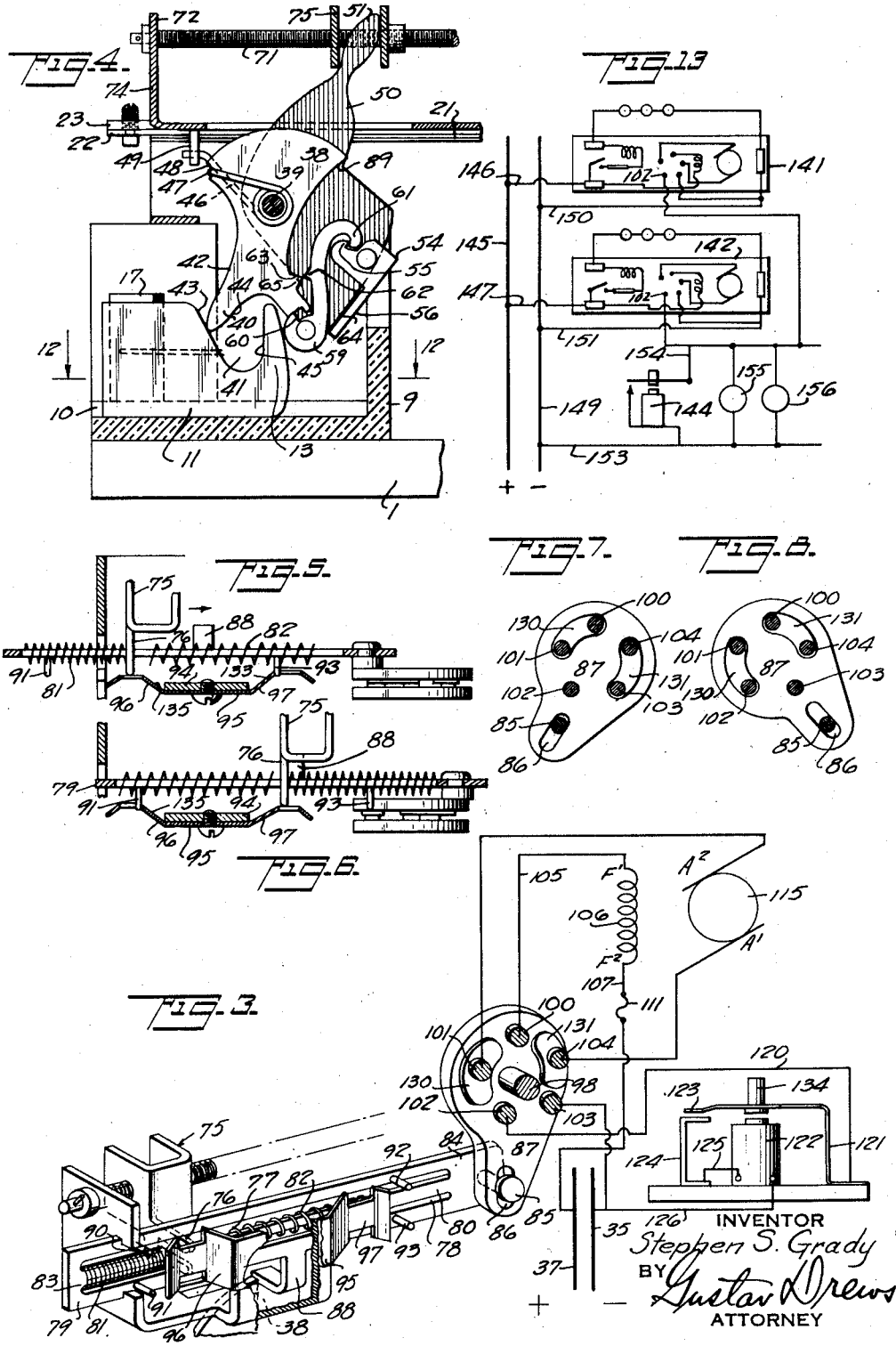
INVENTOR
Stephen S. Grady
BY Gustav Drews
ATTORNEY

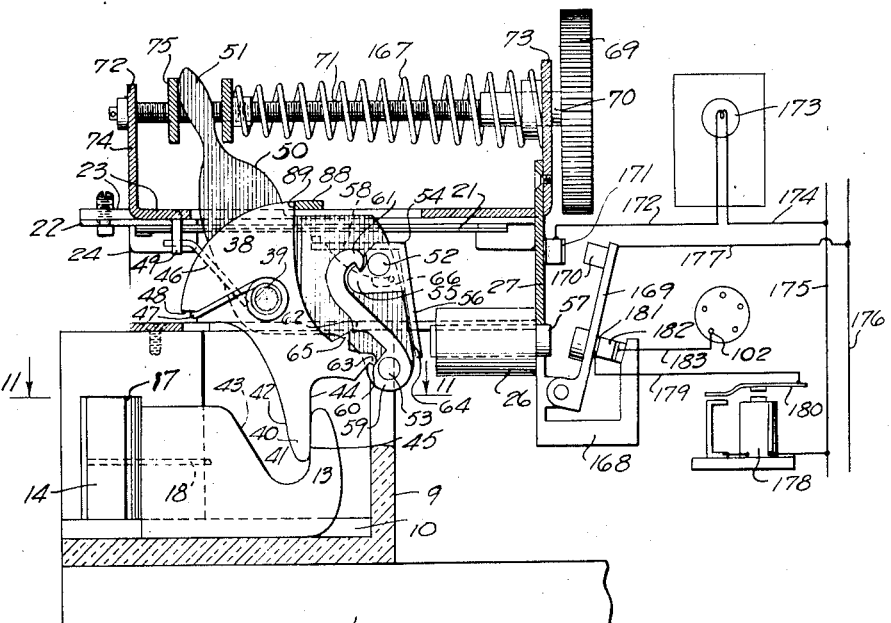
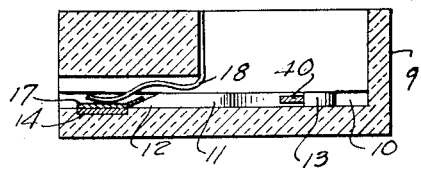
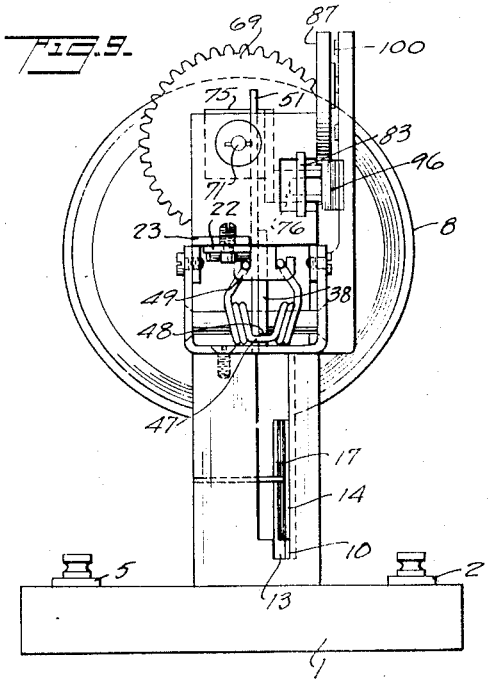
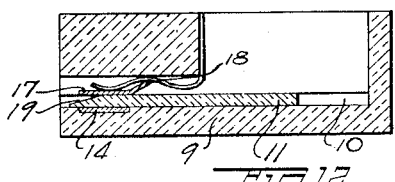

Patented Feb. 27, 1934

1,948,519

UNITED STATES PATENT OFFICE 1,948,519

CIRCUIT INTERRUPTER

Stephen S. Grady, Magnolia, N. C., assignor to Fusoid Electric Co., Inc., a corporation of New York Application August 17, 1929, Serial No. 386,589
Renewed May 6, 1933

16 Claims. (Cl. 175—294)

This invention relates to circuit interrupters such for instance as circuit breakers which can with facility be reset to re-establish the circuit after the emergency is passed, as distinguished from fuses which cannot be reset without entirely replacing the fuse.

Among the main objects of the present invention it is aimed to provide a circuit interrupter which can be connected to the ordinary circuit of a small residence or the like and which may be reset not only at the central station or main outlet box, as is the case with some circuit breakers today in use, but which can be reset at a distance from the main outlet box.

Among other objects it is also aimed to provide a circuit interrupter which can be readily reset after a circuit has been broken by the housewife not acquainted with electrical appliances. To this end, the present invention aims particularly to provide a circuit interrupter which is operatively connected with a motive means, which motive means can be caused to actuate by the mere actuation of a switch such as a button, located at a distance from the circuit interrupter or outlet.

The present invention still further aims to provide a number of electric connections for such electromotive means or to provide switches such as buttons located in various parts of a house such as a private residence so that the attendant or housewife may with facility cause the circuit interrupter to be reset from various parts of the house where she may be located and thus spare her the necessity of possibly traveling through a dark house or dark rooms to the outlet box or wherever the circuit breaker resetting means may be located.

These and other features, capabilities and advantages of the invention will appear from the subjoined detail description of specific embodiments thereof, illustrated in the accompanying drawings in which Figure 1 is a side elevation of a device made according to one embodiment of the present invention;

Fig. 2 is a plan view of the same showing the wiring connections thereof diagrammatically;

Fig. 3 is a perspective of the main actuating parts showing the wire connections and switch element in neutral position, the position of the device illustrated in Figs. 1 and 2;

Fig. 4 is a transverse section of a portion of the device showing the position of the several parts after the circuit has been broken;

Fig. 5 is a longitudinal section of a portion of the device showing the relative position of the switch plate actuating element immediately after the circuit has been broken and when the switch plate has been actuated into position to establish an electric circuit with the electric motor;

Fig. 6 is a longitudinal section of the same parts illustrated in Fig. 5 but showing them in the position when the switch plate has been actuated into position for establishing the electrical connections for reversing the actuation of the motor preparatory to the resetting actuation;

Fig. 7 is a side elevation of the switch plate showing its position relative to its contacts when the device is in the position illustrated in Fig. 5;

Fig. 8 is a side elevation of the switch plate and its position with respect to its contacts when the device is in the position illustrated in Fig. 6;

Fig. 9 is an end elevation of the device illustrated in Fig. 1;

Fig. 10 is a transverse section of the device equipped with an auxiliary signaling attachment, the working parts of the circuit interrupter being disposed in neutral position, the position illustrated in Fig. 1;

Fig. 11 is a longitudinal section on the line 11—11 of Fig. 10;

Fig. 12 is a longitudinal section on the line 12—12 of Fig. 4; and

Fig. 13 is a diagram illustrating a system in which a plurality of resetting means can be reset by a single switch element In the embodiment illustrated in Figs. 1 to 9 inclusive, there is provided a platform or base 1 preferably composed of insulating material having mounted thereon, as illustrated in Fig. 2, five connecting bars 2, 3, 4, 5 and 6, a support 7 for a motor 8, and a support 9 preferably composed of insulating material for the actuating mechanism of the circuit breaker.

The support 9 has a guideway 10 to receive the interposer 11 preferably composed of insulating material and having an inclined wedge-shaped nose 12 and an upwardly extending arm 13. To one side of the guideway 10 there is fixed a main contact member 14 which is connected by means of the conductor 15 to the binding post 16 on the contact plate 5.

Resiliently in engagement with the contact piece 14 there is provided the yieldable contact piece 17 which has an inclined flange 18 to cooperate with the inclined face 19 of the nose 12 of the interposer 11 so that when the interposer 11 is moved from the position shown in Fig. 11 to the position shown in Fig. 12, the face 19 of the interposer 11 will strike the flange 18 of the contact piece 17 and flex the same outwardly to release the contact piece 14 and break the circuit.

The contact piece 17, as shown in Fig. 2, is connected by the conductor 20 with the thermostatic element 21, preferably a bi-metal, which is secured to the insulating bar 22, preferably composed of a fibrous substance, which is secured to the lower surface of the lower wall member 23 of the bracket 74 supported on the bracket 24 which is supported on and secured to the upper edge of the support 9. The bimetal 21 is connected by the conductor 25 to the magnet 26 preferably secured to the inner face of the end wall member 27 of the bracket 24, see Fig. 10. The magnet 26 in turn is connected by the conductor 28 to the binding post 29 of the contact plate 2. The contact plate 2, see Fig. 2, is connected by the conductor 30 to the load 31, the lighting system as an instance, which load 31 in turn is connected by the conductor 32 to the binding post 33 of the contact plate 4. The contact plate 4 in turn is provided with a binding post 34 which is connected by the conductor 35 to the return of the main supply in the usual way. The contact plate 5 is provided with a binding post 36 which is connected by the conductor 37 to the ingoing supply line of the main current supply.

From the foregoing it will appear that when the interposer 11 is disposed in the position indicated in Figs. 10 and 11, the circuit will be made. It will also appear that when it is desired to break the circuit in case of an overload it is only necessary to actuate the interposer 11 to space the contact piece 17 from the contact piece 14 and thus break the circuit.

For actuating the interposer 11 the means now to be described are provided.

A main circuit breaking actuating plate 38 is mounted on the shaft 39 journaled in the bracket 24. The actuating plate 38 has a dependant finger 40 extending into the recess 41 adjacent to the projection 13 of the interposer 11 so that the face 42 of the finger 40 will be in position to cooperate and engage the face 43 of the interposer to actuate the interposer into circuit breaking position, and the face 44 of the finger 40 will be in position to oppose and engage the face 45 of the projection 13 to actuate the interposer 11 into circuit making position.

A spring 46 is provided for actuating the actuating plate 38 to in turn actuate the interposer 11 into circuit breaking position. This spring is preferably, as illustrated, coiled around the shaft 39 on both sides of the plate 38 and provided with an intermediate portion 47 engaging the shoulder 48 of the plate 38. The ends of the spring 46 are secured to the abutment plate 49 formed on the wall 23 of the bracket 74. On the shaft 39 there is also provided a main circuit breaking actuating plate 50. The plate 50 is provided with an upwardly extending arm or finger 51 which is adapted to be engaged and actuated by means hereinafter to be described for actuating the several parts to again make the circuit after the same has been broken.

On the plate 50 there are also provided two stub shafts 52 and 53. On the stub shaft 52 there is provided a latch bracket 54 having a hook or shoulder portion 55, a tail piece 56 to cooperate with the core 57 of the magnet 26, and a wing portion 58 to cooperate with the bi-metal thermostatic element 21. On the stub shaft 53 there is provided the link member 59 having a lower hook or catch member 60, an upper hook or catch member 61, and a cam projection 62. The link member 59 serves to connect the circuit breaking actuating plate 38 with the circuit making actuating plate 50 during the resetting operation and to anchor the same together in the circuit making position. In circuit making position, the hook member 60 engages the hook member 63 of the actuating plate 38, and the hook portion 61 engages the hook portion 55 of the latch member 54. The tail piece 56 extends across the lateral edge of the plate member 50 so that the tension of the spring 46 cannot free the plate 38. On the other hand, when the tail piece 56 is engaged and moved away from the edge 64 of the plate 50 to cause the hook portion 55 to clear the hook portion 61, the plate 38 will be free to be moved by the spring 46 in turn to cause its arm 40 to engage the face 43 of the interposer 11 to actuate the same into circuit breaking position. This tail piece 56 is so swung away from the edge 64 of the actuating plate 50 by causing the latch member 54 to rock about the shaft 52.

If the emergency consists in a gradual overload serving gradually to heat the thermostatic element 21 as distinguished from a sudden overload, the thermostatic element 21 will bend away from the fibrous member 22 eventually to engage the wing portion 58 and actuate the same to cause the latch member 54 to rock about the shaft 52 to cause the catch member 55 to clear the catch member 61. On the other hand, in the case of a sudden intense overload of sufficient magnitude, the magnet 26 will be energized to attract the tail piece 56, again to rock the latch member 54 about the shaft 52 to cause the hook portions 55 and 61 to clear one another.

When the catches 55 and 61 clear one another, the link 59 is free to be tilted downward to permit the catch members 63 and 60 to clear one another and consequently permit the actuating plate 38 to be actuated by the spring 46, at which time the link member 59 will rock about its pivot pin 53 while the actuating plate 50 is still in its circuit making position. Thereupon, in order to cause the device to be reset into circuit making position, it will be necessary to actuate the plate 50 to the right relative to Fig. 10 into the position shown in Fig. 4 where the link 59 will again be caused to connect the two plates 38 and 50 by causing its catch 61 to engage the catch 55 of the latch member 54, and by causing its catch 60 to engage the catch 63 of the plate 38.

The projection 62, as will appear from Fig. 4, will serve as a stop to cooperate with the projection 65 to prevent the link 59 from rocking clear of the projections 63 and 55. As appears from Fig. 10, the tail piece of the latch member 54 is normally held in engagement with the edge 64 of the plate 50 by means of the spring 66. It will also appear that when the plate 38 has been released and actuated into circuit breaking position while the plate 50 is still in circuit making position, the link 59 may fall back and rest on the stop 65 and cannot swing beyond the same so that upon the subsequent movement of the plate 50 to the right, the link 59 will merely be swung over to cause its nose 61 to engage the nose 55.

In the modification of Figs. 1 to 9 inclusive, the plate 50 is automatically swung to the right relative to Fig. 10 into the position indicated in Fig. 1 for causing the link 59 to connect the plates 50 and 38 with one another immediately after the circuit has been broken, in which position the plate 50 will be connected with the plate 38 ready to reset the device in circuit making position upon the actuation of the plate 50 back into the position shown in Fig. 10. The mechanism for so actuating the plate 50 will now be described.

This actuating mechanism is driven by the electric motor 8. On the shaft 67 of the motor 8, there is provided a pinion 68 which meshes with the gear 69 on the shaft 70. The motor 8 is a reversible motor so that it can, according to its electric connections, rotate the pinion 68 and gear 69 either backward or forward. On the shaft 70 there is formed the screw 71 which is journaled in the arms 72 and 73 of the bracket 74 secured on the top of the bracket 24. On the screw 71 there is provided a bracket or yoke member 75 having two jaw members screwthreadedly connected to the screw 71 and disposed on opposite sides of the arm 51.

The yoke member 75, see Figs. 2 and 3, has a bifurcated portion 76 extending through the two slots 77 and 78 respectively of the bar 79, the slots 77 and 78 forming a supporting rail 80 for the springs 81 and 82 respectively, the spring 81 being disposed between the bifurcated portion 76 and the end 83 of the bar 79, and the spring 82 being disposed between the bifurcated portion 76 and the end 84 of the bar 79. The end 84 of the bar 79 is provided with a pin 85 extending through the slot 86 of the switch actuating plate 87.

The portion of the bar 79, preferably intermediate its length and below the slot 78, is provided with a tongue 88 bent at right angles to the bar 79 extending across and into the path of movement of the edge 89 of the plate 38, see Fig. 10. This edge 89 when in circuit making position engages the tongue 88 and anchors the bar 79 against movement to the left with respect to Fig. 10. On the bar 79 there are formed two pins 90 and 91 respectively near the end 83 of the bar 79 and another set of pins 92 and 93 near the end 84 of the bar 79. The bracket 74 has an upwardly extending plate portion 94 extending outside of the bar 79 and having formed thereon a spring portion 95 which has two spring arms 96 and 97 respectively, the spring arm 96 having two recesses to cooperate with the pins 90 and 91 respectively, and the spring arm 97 having two recesses to cooperate with the pins 92 and 93 respectively.

The spring 95, pins 90, 91, 92 and 93, and springs 81 and 82 respectively, cooperate with the bar 79 and the bracket 75 to actuate the switch plate 87 into neutral position, the position indicated in Fig. 3, into the position illustrated in Fig. 7 where the motor is rotating in one direction, and the position in Fig. 8 where the motor is rotating in the reverse direction. These three positions of the switch plate will succeed one another substantially as follows, in the normal operation of the device.

Firstly, in neutral position, Fig. 3, where the device is in circuit making position, that is, the position of Figs. 1, 2, 3 and 10; secondly, the position of Fig. 7 immediately after the circuit has been broken and the motor is actuating the pinion 68, gear 69 and screw 71 to move the bracket 75 toward the gear 69 and consequently to bring the spring 82 under tension; thirdly, the position illustrated in Fig. 8 when the motor 8 is ready to be connected to operate in reverse direction and during the rotation of the motor after the resetting action has been initiated to actuate the pinion 68, the gear 69 and the screw 71 to actuate the bracket 75 away from the gear 69 into circuit making position; and fourthly, or again firstly, the neutral position when the device is again in circuit making position.

The switch plate 87 and its several connections are now to be described preparatory to describing the operation of the several elements of the device during the several successive positions of the switch plate 87.

The switch plate 87 is mounted on the stub shaft 98 extending from the extension 99 secured to the bracket 24 and extending upwardly adjacent to the gear 69. The extension 99 is preferably composed of an insulating material and has formed thereon five contacts 100, 101, 102, 103 and 104. The contact 100 is connected by the conductor 105 to the field 106 of the motor 8, and the field 106 in turn in connected by the conductor 107 to the contact 108 on the contact plate 6. The contact plate 6 is in turn provided with a contact 109 which is connected by the conductor 110 to the fuse 111, which fuse 111 is connected by the conductor 112 to the contact 113 of the contact plate 5. The contact 101 of the switch plate 87 is connected by the conductor 114 to the armature 115 of the motor 8, see Fig. 3, and the armature 115 of the motor 8 in turn is connected by the conductor 116 to the contact 104. The contact 102 is connected by the conductor 117 to the contact 118 of the contact plate 3, which contact plate 3 is provided with a contact 119, which is connected by the conductor 120 to the contact plate 121 of the switch button, which is preferably flexible as shown in Fig. 3 and adapted to be attracted by the magnet 122 when energized and bring the free end 123 of the contact plate 121 into engagement with the contact plate 124, which is connected by the conductor 125 to the winding of the magnet 122, which is connected by the conductor 126 to the contact 127 on the contact plate 4, which contact plate 4 is also provided with a contact 128 which is connected by the conductor 129 to the contact 103 on the switch plate 87.

The switch plate 87, as particularly shown in Figs. 3, 7 and 8, is preferably composed of insulating material and is provided with two arcuate contact plates 130 and 131.

In the operation of the device, it will thus appear that when the several parts are disposed, as illustrated in Figs. 1, 2, 3, 10 and 11, the circuit making position, the contact plate 130 will engage only the contact 101 of the extension 99; the contact plate 131 will engage only the contact 104 of the extension 99; the flexible arm 121 of the switch, see particularly Fig. 3, will clear the magnet 122; the spring 81 will be under semi-tension, the edge 89 (Fig. 4) of the plate 38 anchoring the tongue 88 of the bar 79 against movement to the left against the opposition of the spring 81 which is tensed between the bifurcated arm 76 of the bracket 75 and the end 83 of the bar 79, while the pins 92 and 93 will project into the recesses of the resilient arm 97 of the spring 95 but clear of the right hand ends of such recesses. In this position of the switch plate 87 the motor 8 will be inoperative, since the contacts 100, 101, 102, 103 and 104 will all be disconnected from one another.

Thereupon, in case of an overload of sufficient intensity either to warp the bi-metal 21 sufficiently or to energize the magnet 26 sufficiently, the latch plate 54 will be rocked to cause the hook portions 55 and 61 to disengage. Thereupon, initially the spring 46 will urge the circuit breaking actuating plate 38 to actuate the interposer 11 into the circuit breaking position illustrated in Fig. 12 where the contacts 17 and 14 are effectively spaced from one another. At the same time, the edge 89 of the plate 38 will move the tongue 88 to clear the same, whereupon the bar 79 will be free to move to the left until the pins 92 and 93 engage the left hand edge of the recesses in the arm 97, see Fig. 5, under the urge of the spring 81 to rock the switch plate 87 into the position indicated in Fig. 7, where the contact plate 130 will connect the contacts 100 and 101, and the contact plate 131 will connect the contacts 103 and 104, in which case, see particularly Fig. 3, the current from the field will pass through the armature terminal $A^2$ of the armature 115 of the motor 8, to the armature $A'$. In this position of the switch plate 87, the contacts 100 and 101 being connected by the contact plate 130 and the contacts 103 and 104 being connected by the contact plate 131, see Fig. 7, the current will pass from the conductor 37 through the conductor 107 and field 106 of the motor through the conductor 105, contact plate 130 and contact 101 and its conductor to the armature terminal $A^2$ of the motor 8 and then across the armature 115 through the armature terminal $A'$ and its conductor to the contact 104, contact plate 131, contact 103 and its conductor to the return conductor 35.

In this position, the motor will be rotating in one direction, which for the purpose of the present description, will be called the forward direction. When so rotating, it will actuate the pinion 68, gear 69 and screw 71 to advance the bracket 75 toward the gear 69, during which movement of the bracket 75, the spring 81 will be entirely liberated and the spring 82 wound up or brought under tension due to the fact that the pins 92 and 93 during this time will engage the recesses in the arm 97 of the spring 95 and thus anchor the bar 79 against movement with the bracket 75.

As soon as the bifurcated end 76 engages the face 133 it will flex the arm 97 outward to clear the pins 92 and 93, whereupon the bar 79 under the urge of the spring 82 will move to the right until the pins 90 and 91 enter the recesses in the arm 96 of the spring 95, in which position the switch plate 87 will be rocked into the position illustrated in Fig. 8 where the contact plate 130 will now connect the contacts 101 and 102, and the contact plate 131 will now connect the contacts 100 and 104. In this position of the switch plate 87, see Fig. 8, the incoming current from the conductor 37 will now pass from the armature terminal $A'$ across the armature 115 to the armature terminal $A^2$ instead of from the armature terminal $A^2$ across the armature 115 to the armature terminal $A'$ as is the case when the switch plate 87 is positioned as in Fig. 7. The current from the conductor 37 will pass through the conductor 107 and conductor 105 to the contact 100 and then across the contact plate 131 to the contact 104 and from the contact 104 by its conductor to the armature terminal $A'$ and then across the armature 115 to the armature terminal $A^2$ and by its conductor to the contact 101 to the contact plate 130 and from the contact plate 130 to the contact 102, and then through the conductor 120 to the flexible contact 121 to its contact terminal 123. When the button 134 is depressed to cause the contact 123 to engage the contact 124, the current will then continue through the contact 124, conductor 125, magnet 122 and conductor 126 to the return line 35. In this position, however, the circuit is broken due to the interruption of the circuit by the switch element consisting of the switch arm 121 being normally spaced from the magnet 122 and contact bar 124. When the bracket 75 finally comes to rest, it will have actuated the plate 50 into the position illustrated in Fig. 4 where the link 59 will again have connected the actuating plate 38 with the actuating plate 50 ready to return the plate 38 into circuit making position and therewith to remove the interposer 11 out of circuit breaking position.

Thereupon, after the emergency has passed and it is desired to reset the device in circuit making position, it is only necessary to depress the button 134, that is momentarily, to bring the contact 123 into engagement with the contact 124 when the magnet 122 will be energized in turn to attract the contact 121. When the magnet 122 is once energized, due to the flow of current through it, it will continue to remain energized and maintain the arm 121 in engagement with it to continue the establishment of the current through the motor 8 with the contacts 100, 101, 102 and 104 connected, as illustrated in Fig. 8. When so connected, the current will pass from the field initially through the armature terminal $A'$ of the armature 115, whereupon the motor will be connected to rotate in the reverse direction. In this direction of rotation, the pinion 68 and gear 69 will be rotated to actuate the screw 71, in turn to actuate the arm 51 away from the gear 69, when the pins 90 and 91 will initially engage the left hand end of the recesses in the arm 96, and thereupon the spring 81 will become tensed or wound up between the arm 76 of the bracket 75 and the end 83 of the bar 79.

The moment of greatest tension in this spring 81 will occur when the arm 76 engages the face 135 of the arm 96 of the spring 95, and thereupon when the bifurcated arm 76 flexes the arm 96 outward to clear the pins 90 and 91, the bar 79 will under the tension of the spring 81 move into the semi-tension position of the spring 81 at the same time rocking the switch plate 87 into the neutral position indicated in Fig. 3 where the contact plate 130 of the switch plate 87 will only engage the contact 101 and the contact plate 131 will only engage the contact 104. In this position of the device, the pins 92 and 93 will not engage the recesses in the arm 97 of the spring 95 and assume the position illustrated in Fig. 3, and the edge 89 of the actuating plate 38 will again engage the tongue 88 to anchor the bar 79 against further movement to the right under the still continuing tension of the spring 81.

As illustrated in Fig. 2, it will be apparent that a wiring system can easily be devised by means of which the circuit for the magnet 122 can be connected from a plurality of distant locations. As an instance, the contact 121 may be connected by the conductor 136 with a plurality of buttons 137 and 138, and such buttons in turn be connected by the conductor 140 with the magnet 122, through which the magnet 122 may be energized to close the circuit for the motor 8 by the actuation of any of the buttons 137 and 138.

It will also be apparent from the modification illustrated diagrammatically in Fig. 13, that a plurality of circuit interrupting devices 141 and 142 may be connected to a single magnetic switch device 144, such as the magnetic switch device 122, which will be effective to reset any one of the circuit interrupting devices 141 and 142 or any two or more of them. The several circuit interrupting devices 141 and 142 are connected to the main positive lead 145 by means of the conductors 146 and 147 respectively, and the several circuit interrupting devices 141 and 142 are connected to the main lead 149 by the conductors 150 and 151 respectively, and the magnet 144 is connected to the main lead 149 by the conductor 153 and to the contacts 102 of the several circuit interrupting devices by the conductor 154. It will be noted that the wiring of the several circuit interrupting devices 141 and 142 is identical with the wiring of the circuit interrupting device illustrated in Fig. 2 and therefore need not be described in detail except to mention that the contact 102 of the circuit interrupting devices 141 and 142 is the same contact 102 referred to in the wiring diagram of Fig. 2.

With the embodiment illustrated in Fig. 13, the magnet 144 may also be energized by any one of a plurality of buttons 155 and 156 similar to the buttons 137 and 138 illustrated in Fig. 2, which buttons may be located at a distance from the outlet board where the circuit interrupting devices are located.

With the motor resetting means, it may be desirable to relieve the motor 8 in part at least of the work required to reset the device in circuit making position. To this extent, and to oppose the operation of the spring 46, a spring 167 is interposed between the bracket 75 and the plate 73.

It may also be desirable with the motor driven resetting mechanism to provide a signal for the attendant when a circuit has been broken. To this end, see Fig. 10, the wall 27 is extended downward to form the bracket 168 which has pivotally connected thereto a lever 169 having a contact 170 at its end to cooperate with the contact 171. The contact 171 is connected by means of the conductor 172 to a signal such as the lamp 173, which lamp 173 is connected by the conductor 174 to one of the main leads 175. The other main lead 176 is connected to the lever 169 by means of the conductor 177.

From the foregoing it will appear that in case of a sudden overload when the magnet 26 is energized to trip the latch plate 54, it will also serve to attract the lever 169 to cause its contact 170 to engage the contact 171 to establish the circuit for the signal 173. According to this scheme, it is also apparent that with facility the lever 169 can be so connected to a magnetic switch such as the magnetic switch 178, similar to the switch controlled by the magnet 122, that the motor 8 will not be connected to return the plate 50 into circuit making position until the lever 169 has been manually withdrawn from the magnet 26.

In Fig. 10, a wiring diagram has been illustrated whereby this can be done. In this figure, the lever 169 is connected by the conductor 179 with the movable contact arm 180 of the magnetic switch 178 and is provided with a contact 181 to engage the contact 182 when the lever is removed from the contact 170 and magnet 26. The contact 182 is connected by the conductor 183 with the contact 102. The lever 169 thus serves to break the circuit through the contact 102 and contact plate 130 of the switch plate 87 when the switch plate 87 is moved into the position illustrated in Fig. 8, the position where the actuating plate 50 would normally be actuated to reset the device in circuit making position. On the other hand, as soon as the lever 169 is manually removed from the magnet 26 and brought into engagement with the contact 182, and the magnet 178 is energized to attract the movable contact 180, the circuit to the motor 8 will be established, resulting in the actuation of the plate 50 back to circuit making position.

It is obvious that various changes and modifications may be made to the details of construction without departing from the general spirit of the invention as set forth in the appended claims.

I claim:

1. In a system of the character described, the combination with a circuit having two contacts, of an interposer for spacing said contacts into circuit breaking position, a circuit breaking actuating plate normally urging said interposer into circuit breaking position, a circuit making actuating plate, means for positioning said circuit making actuating plate, connecting means for connecting said circuit making actuating plate to said circuit breaking actuating plate, means sensitive to an overload to disrupt said connecting means to liberate said circuit breaking actuating plate, an electric motor, drive means connecting said electric motor with said positioning means, controlling means cooperating with said circuit breaking actuating plate to cause said motor to actuate said positioning means in turn to actuate said circuit making actuating plate into position for causing said connecting means again to connect said circuit breaking actuating plate to said circuit making actuating plate and means cooperating with said controlling means for reversing said motor to cause said driving means to return said positioning means and therewith return said circuit making plate and circuit breaking plate into circuit making position.

2. In a system of the character described, the combination with a circuit having two contacts, of an interposer, a circuit breaking actuating device, means sensitive to an overload cooperating with said circuit breaking device to actuate said interposer to separate said contacts, a circuit making actuating device cooperating with said circuit breaking actuating device to actuate said circuit breaking actuating device and interposer into circuit making position, driving means for said circuit making actuating device, an electric motor operatively connected to said driving means, and means including electric switches in the circuit of said motor located at a distance from said motor to control the operation of said motor and thereby in turn be operative to cause said circuit breaking device to be reset into circuit making position after an overload has passed.

3. In a system of the character described, the combination with a circuit having two contacts, of a circuit breaking device for separating said contacts in case of an overload, a circuit making device, means for actuating the circuit making device to cooperate with said circuit breaking device to reset the same into circuit making position, driving means for said circuit making device, an electric motor operatively connected to said driving means, and means including switch elements included in the circuit of said motor located at a distance therefrom to control the operation of said motor whereby said circuit making device may be actuated to actuate said circuit breaking device into circuit making position after the overload has passed.

4. In a system of the character described, the combination with a circuit having two contacts, of a circuit breaking device for separating said contacts in case of an overload, a circuit making device, means for initially actuating said circuit breaking device in case of an overload, means adapted to connect said circuit making device to said circuit breaking device, drive means for actuating said circuit making device in one direction after said circuit breaking device has been actuated by said initial actuating means to cause said connecting means to connect said circuit making device to said circuit breaking device, an electric motor operatively connected to actuate said drive means in said one direction, and means for reversing said motor to reverse the direction of said drive means in turn to reverse the direction of said circuit making device after it has become connected to said circuit breaking device to return said circuit breaking device into circuit making position.

5. In a system of the character described, the combination with a circuit having two contacts, of a circuit breaking device for separating said contacts in case of an overload, a circuit making device, means for initially actuating said circuit breaking device in case of an overload, means adapted to connect said circuit making device to said circuit breaking device, drive means for actuating said circuit making device in one direction after said circuit breaking device has been actuated by said initial actuating means to cause said connecting means to connect said circuit making device to said circuit breaking device, an electric motor operatively connected to actuate said drive means in said one direction, means for reversing said motor to reverse the direction of said drive means in turn to reverse the direction of said circuit making device after it has become connected to said circuit breaking device to return said circuit breaking device into circuit making position, and means including switches included in the circuit of said motor located at a distance from said motor and operable to initiate the reversing direction of said motor.

6. In a system of the character described, the combination with a circuit having two contacts, of a circuit breaking actuating device to separate said contacts in case of an overload, a spring for urging said circuit breaking device into circuit breaking position, a circuit making device, means adapted to connect said circuit making device to said circuit breaking device, drive means for actuating said circuit making device into position to cause said connecting means to connect said circuit making device to said circuit breaking device, and means for thereupon reversing the direction of said drive means to return said circuit making device with said circuit breaking device into circuit making position.

7. In a system of the character described, the combination with a circuit having two contacts, of a circuit breaking actuating device to separate said contacts in case of an overload, a spring for urging said circuit breaking device into circuit breaking position, a circuit making device, means adapted to connect said circuit making device to said circuit breaking device, drive means for actuating said circuit making device into position to cause said connecting means to connect said circuit making device to said circuit breaking device, means for thereupon reversing the direction of said drive means to return said circuit making device with said circuit breaking device into circuit making position, and a second spring cooperating with said latter means to reverse said drive means in opposition to said first main spring.

8. In a system of the character described, the combination with a circuit having two contacts, of a circuit breaking device for separating said contacts in case of an overload, a spring for urging said circuit breaking device into circuit breaking position, a circuit making device, means for operatively connecting said circuit breaking device to said circuit making device to permit said circuit making device normally to anchor said circuit breaking device in circuit making position and to permit said circuit making device to return said circuit breaking device into circuit making position after an overload has taken place, means sensitive to an overload to disrupt said connecting means in case of an overload to permit said spring to actuate said circuit breaking device to separate said contacts, drive means operatively connected to said circuit making device to actuate said circuit making device after an overload into position to re-establish its connection with said circuit breaking device by said connecting means, means for reversing the actuation of said drive means to return said circuit making device into circuit making position after its connection with said circuit breaking device, and means for initiating the reversing action of said drive means after said circuit making device has been connected to said circuit breaking device.

9. In a system of the character described, the combination with a circuit having two contacts, of a circuit breaking device for separating said contacts in case of an overload, a spring for urging said circuit breaking device into circuit breaking position, a circuit making device, means for operatively connecting said circuit breaking device to said circuit making device to permit said circuit making device normally to anchor said circuit breaking device in circuit making position and to permit said circuit making device to return said circuit breaking device into circuit making position after an overload has taken place, means sensitive to an overload to disrupt said connecting means in case of an overload to permit said spring to actuate said circuit breaking device to separate said contacts, drive means operatively connected to said circuit making device to actuate said circuit making device after an overload into position to re-establish its connection with said circuit breaking device by said connecting means, means for reversing the actuation of said drive means to return said circuit making device into circuit making position after its connection with said circuit breaking device, means for initiating the reversing action of said drive means after said circuit making device has been connected to said circuit breaking device, and means cooperating with said drive means in its reversing action to return said circuit making device in opposition to said spring.

10. In a system of the character described, the combination with a circuit having two contacts, of a circuit breaking device for separating said contacts in case of an overload, a spring for urging said circuit breaking device into circuit breaking position, a circuit making device, means for operatively connecting said circuit breaking device to said circuit making device to permit said circuit making device normally to anchor said circuit breaking device in circuit making position and to permit said circuit making device to return said circuit breaking device into circuit making position after an overload has taken place, means sensitive to an overload to disrupt said connecting means in case of an overload to permit said spring to actuate said circuit breaking device to separate said contacts, drive means operatively connected to said circuit making device to actuate said circuit making device after an overload into position to re-establish its connection with said circuit breaking device by said connecting means, and means for reversing the actuation of said drive means to return said circuit making device into circuit making position after its connection with said circuit breaking device.

11. In a system of the character described, the combination with a circuit having two contacts, of a circuit breaking device for separating said contacts in case of an overload, a spring for urging said circuit breaking device into circuit breaking position, a circuit making device, means for operatively connecting said circuit breaking device to said circuit making device to permit said circuit making device normally to anchor said circuit breaking device in circuit making position and to permit said circuit making device to return said circuit breaking device into circuit making position after an overload has taken place, means sensitive to an overload to disrupt said connecting means in case of an overload to permit said spring to actuate said circuit breaking device to separate said contacts, drive means operatively connected to said circuit making device, an electric motor operatively connected to said drive means, a plurality of conductors for connecting said motor to the main supply, a main switch having a plurality of contacts, connected to said conductors, means operatively connecting said switch to said spring to actuate said switch into position for causing said motor to actuate said drive means in one direction to actuate said circuit making device after an overload into position to re-establish its connection by said connecting means with said circuit breaking device and thereupon to actuate said switch into position to break the circuit to cause said motor to come to rest and be prepared to rotate in a reverse direction to actuate said switch into neutral position after said circuit making device has returned said circuit breaking device into circuit making position.

12. In a system of the character described, the combination with a circuit having two contacts, of a circuit breaking device for separating said contacts in case of an overload, a spring for urging said circuit breaking device into circuit breaking position, a circuit making device, means for operatively connecting said circuit breaking device to said circuit making device to permit said circuit making device normally to anchor said circuit breaking device in circuit making position and to permit said circuit making device to return said circuit breaking device into circuit making position after an overload has taken place, means sensitive to an overload to disrupt said connecting means in case of an overload to permit said spring to actuate said circuit breaking device to separate said contacts, drive means operatively connected to said circuit making device, an electric motor operatively connected to said drive means, a plurality of conductors for connecting said motor to the main supply, a main switch having a plurality of contacts connected to said conductors, means operatively connecting said switch to said spring to actuate said switch into position for causing said motor to actuate said drive means in one direction to actuate said circuit making device after an overload into position to re-establish its connection by said connecting means with said circuit breaking device, thereupon to actuate said switch into position to break the circuit to cause said motor to come to rest and be prepared to rotate in a reverse direction and to actuate said switch into neutral position after said circuit making device has returned said circuit breaking device into circuit making position, and means for closing the circuit of said motor when said switch has been actuated into position where said motor will operate in reverse direction to permit said circuit making device to return said circuit breaking device into circuit making position.

13. In a system of the character described, the combination with a circuit having two contacts, of a circuit breaking device for separating said contacts in case of an overload, a spring for urging said circuit breaking device into circuit breaking position, a circuit making device, means for operatively connecting said circuit breaking device to said circuit making device to permit said circuit making device normally to anchor said circuit breaking device in circuit making position and to permit said circuit making device to return said circuit breaking device into circuit making position after an overload has taken place, means sensitive to an overload to disrupt said connecting means in case of an overload to permit said spring to actuate said circuit breaking device to separate said contacts, drive means operatively connected to said circuit making device, an electric motor operatively connected to said drive means, a plurality of conductors for connecting said motor to the main supply, a main switch having a plurality of contacts connected to said conductors, means operatively connecting said switch to said spring to actuate said switch into position for causing said motor to actuate said drive means in one direction to actuate said circuit making device after an overload into position to re-establish its connection by said connecting means with said circuit breaking device, thereupon to actuate said switch into position to break the circuit to cause said motor to come to rest and be prepared to rotate in a reverse direction and to actuate said switch into neutral position after said circuit making device has returned said circuit breaking device into circuit making position, a magnetic switch cooperating with said main switch, and means for causing said magnetic switch to close and thereby close the circuit to said motor whereupon said magnetic switch will remain closed until said main switch has been actuated into neutral position.

14. In a system of the character described, the combination with a circuit having two contacts, of a circuit breaking device for separating said contacts in case of an overload, a spring for urging said circuit breaking device into circuit breaking position, a circuit making device, means including a latch for operatively connecting said circuit breaking device to said circuit making device to permit said circuit making device normally to anchor said circuit breaking device in circuit making position and to permit said circuit making device to return said circuit breaking device into circuit making position after an overload has taken place, an emergency signal, and means sensitive to an overload in case of an overload to operate said emergency signal and to disrupt said connecting means to permit said spring to actuate said circuit breaking device to separate said contacts.

15. In a system of the character described, the combination with a circuit having two contacts, of a circuit breaking device for separating said contacts in case of an overload, a spring for urging said circuit breaking device into circuit breaking position, a circuit making device, means including a latch for operatively connecting said circuit breaking device to said circuit making device to permit said circuit making device normally to anchor said circuit breaking device in circuit making position and to permit said circuit making device to return said circuit breaking device into circuit making position after an overload has taken place, an emergency signal, means sensitive to an overload in case of an overload to operate said emergency signal and to disrupt said connecting means to permit said spring to actuate said circuit breaking device to separate said contacts, drive means operatively connected to said circuit making device to actuate said circuit making device after an overload into position to re-establish its connection by said connecting means with said circuit breaking device, means for reversing the actuation of said drive means to return said circuit making device after its connection with said circuit breaking device into circuit making position, and means for initiating said reversing means including the manual resetting of said emergency signal and the manual actuation of an electric switch.

16. The combination with a plurality of circuit interrupting systems, of a circuit including a pair of contacts for each interrupting system, a circuit breaking device for separating the contacts of each circuit interrupting device in case of an overload, a spring for urging the circuit breaking device of each interrupting device into circuit breaking position, a circuit making device for each interrupting device, means including a latch for operatively connecting the circuit breaking device of each interrupting device to permit said circuit making devices normally to anchor said circuit breaking devices in circuit making position and to permit said circuit making devices to return said circuit breaking devices into circuit making position after an emergency has taken place, means in each interrupting device sensitive to an overload for disrupting its connecting means in case of an overload to permit its spring to actuate its circuit breaking device to separate its contacts, drive means operatively connected to each circuit making device to actuate said circuit making device after an overload into position to re-establish its connection by said connecting means with its circuit breaking device, means for reversing the actuation of the drive means of each interrupting device to return its circuit making device after its connection with said circuit breaking device into circuit making position, a switch, and conductors including contact means connecting said switch to said interrupting devices for initiating the reversing actuation of any one or all of said drive means according to the interruption or interruptions made.

STEPHEN S. GRADY.